(12) United States Patent
Heiniger et al.

(10) Patent No.: US 12,281,033 B2
(45) Date of Patent: Apr. 22, 2025

(54) METHOD AND DEVICE TO CLEAN A TREATMENT WATER CONTAINING A VETERINARY PRODUCT FOR AQUATIC ANIMALS

(71) Applicant: SUEZ Groupe, Paris la Défense (FR)

(72) Inventors: Bruno Heiniger, Boll (CH); Stefan Amann, Rielasingen (DE); Laurent De Franceschi, Cernay (FR)

(73) Assignee: SUEZ Groupe, Paris la Défense (FR)

( * ) Notice: Subject to any disclaimer, the term of this patent is extended or adjusted under 35 U.S.C. 154(b) by 452 days.

(21) Appl. No.: 17/616,177

(22) PCT Filed: Jun. 3, 2020

(86) PCT No.: PCT/EP2020/065283
§ 371 (c)(1),
(2) Date: Dec. 2, 2021

(87) PCT Pub. No.: WO2020/245152
PCT Pub. Date: Dec. 10, 2020

(65) Prior Publication Data
US 2022/0242761 A1   Aug. 4, 2022

(30) Foreign Application Priority Data
Jun. 3, 2019   (EP) ..................... 19305712

(51) Int. Cl.
*C02F 1/78*   (2023.01)
*C02F 1/66*   (2023.01)
(Continued)

(52) U.S. Cl.
CPC ................. *C02F 1/78* (2013.01); *C02F 1/66* (2013.01); *C02F 1/70* (2013.01); *C02F 1/722* (2013.01); *C02F 1/725* (2013.01)

(58) Field of Classification Search
CPC .... C02F 1/283; C02F 1/32; C02F 1/66; C02F 1/70; C02F 1/72; C02F 1/722;
(Continued)

(56) References Cited

U.S. PATENT DOCUMENTS 8,038,938 B2 * 10/2011 Cabello ................. C02F 1/725
210/748.13
2007/0269346 A1 * 11/2007 Wohltjen ........... G01N 33/0014
422/83

FOREIGN PATENT DOCUMENTS

CA        2711191 A1    1/2012
CN        104512956 A   4/2015
(Continued)

OTHER PUBLICATIONS

Duan et al, CN 107459209A, English Machine Translation, pp. 1-9. (Year: 2017).*

(Continued)

*Primary Examiner* — Claire A Norris
(74) *Attorney, Agent, or Firm* — Conley Rose P.C.

(57) ABSTRACT

A method to clean a treatment water containing brackish or sea water and further containing a veterinary product for aquatic animals, the method comprising the steps of:
  moving the treatment water, from a treatment aquatic area in which the aquatic animals are treated, toward a reaction vessel,
  performing a first degradation step of a portion of the veterinary product from the moved treatment water in the reaction vessel by an advanced oxidation process comprising introducing ozone and a basic substance, to obtain a reacting treatment water,
  performing a second degradation step of a remaining portion of the veterinary product in the reacting treatment water after the first degradation step, by retaining
(Continued)

the reacting treatment water during a predetermined time and without introducing ozone, reducing the remaining oxidant species of the reacting treatment water, after the second degradation step, in order to obtain a clean treatment water.

17 Claims, 3 Drawing Sheets (51) Int. Cl.
*C02F 1/70* (2023.01)
*C02F 1/72* (2023.01)

(58) Field of Classification Search
CPC ........ C02F 1/725; C02F 1/78; C02F 2101/30; C02F 2103/20; C02F 2301/046; C02F 2305/023
USPC .......................................................... 210/760
See application file for complete search history.

(56) References Cited

FOREIGN PATENT DOCUMENTS

| CN | 107459209 A |   | 12/2017 |
| CN | 107973392 A | * | 5/2018 |
| CN | 108658209 A |   | 10/2018 |
| CN | 109231417 A |   | 1/2019 |
| JP | 2009107488 A | * | 5/2009 |
| KR | 20000021100 U |   | 12/2000 |
| WO | 2016092050 A1 |   | 6/2016 |
| WO | 2020245152 A1 |   | 12/2020 |

OTHER PUBLICATIONS

Mukai et al, JP 2009107488A, English Machine Translation, pp. 1-10 (Year: 2009).*

Wang et al, CN 107973392 A, English machine translation, pp. 1-6 (Year: 2018).*

Chinese Office Action dated Apr. 12, 2023, Chinese Application No. 202080041037.2 filed on Jun. 3, 2020, 9 pages.

Foreign Communication from a Related Counterpart Application, International Search Report and Written Opinion dated Jul. 20, 2020, International Application No. PCT/EP2020/065283 filed on Jun. 3, 2020.

Foreign Communication from a Related Counterpart Application, Extended European Search Report dated Sep. 6, 2019, European Application No. 19305712, filed Jun. 3, 2019.

Chinese Office Action dated Feb. 27, 2024, Chinese Application No. 202080041037.2 filed on Jun. 3, 2020.

Fangxi, et al., "Treatment and Utilization of Phenol-containing Wastewater", Chemical Industry Publishing House, 6 pages, Feb. 1983.

Yang, et al., "Beverage Processing Technology", Chongqing University Press, 8 pages, Feb. 2015.

* cited by examiner

METHOD AND DEVICE TO CLEAN A TREATMENT WATER CONTAINING A VETERINARY PRODUCT FOR AQUATIC ANIMALS

CROSS-REFERENCE TO RELATED APPLICATIONS

The present application is a filing under 35 U.S.C. 371 as the National Stage of International Application No. PCT/EP2020/065283, filed Jun. 3, 2020, entitled "METHOD AND DEVICE TO CLEAN A TREATMENT WATER CONTAINING A VETERINARY PRODUCT FOR AQUATIC ANIMALS," which claims priority to European Application No. 19305712.2 filed with the European Patent Office on Jun. 3, 2019, both of which are incorporated herein by reference in their entirety for all purposes.

FIELD OF THE INVENTION

The present invention relates to a method and a degradation circuit to clean a treatment water containing a veterinary product for aquatic animals. Additionally, the present invention relates to a treatment method and a treatment device adapted to treat aquatic animals.

BACKGROUND OF THE INVENTION

Aquaculture or aquafarming involves cultivating freshwater or saltwater populations of aquatic animals such as fishes, crustaceans or molluscs under controlled conditions and represents a valuable source of food for mankind while avoiding a massive harvest of wild species from the environment.

However, concentrated populations of aquatic animals may develop diseases or be infested by parasites and there is thus an important need to treat these farmed populations of aquatic animals with veterinary products in order to preserve their health and value. This can be done by adding a veterinary product into a growth aquatic area containing the aquatic animals.

Thus, there is a need for a method and a degradation circuit to clean a treatment water containing a veterinary product before releasing the treatment water into the environment.

When the growth aquatic area is a net or a cage placed in an open environment such as a river, a lake or a sea, a direct addition of the veterinary product is not efficient and may contaminate the surrounding environment. There is thus a need for a treatment method and a treatment device adapted to treat aquatic animals while reducing the amount of veterinary product spread in the environment.

SUMMARY OF THE INVENTION

This objective is accomplished by a method to clean a treatment water containing brackish or sea water and further containing a veterinary product for aquatic animals, the method comprising the steps of:
  moving the treatment water, from a treatment aquatic area in which the aquatic animals are treated, toward a reaction vessel,
  performing a first degradation step of a portion of the veterinary product from the moved treatment water in the reaction vessel by an advanced oxidation process comprising introducing ozone and a basic substance, to obtain a reacting treatment water,
  performing a second degradation step of a remaining portion the veterinary product in the reacting treatment water after the first degradation step, by retaining the reacting treatment water during a predetermined time and without introducing ozone,
  reducing the remaining oxidant species of the reacting treatment water, after the second degradation step, in order to obtain a clean treatment water.

This method allows to reduce the veterinary product to very low concentration while limiting the quantity of ozone and basic substance and thus limiting the costs and the environmental impact of the treatment of aquatic animals.

Advantageously, the basic substance is introduced so that the pH of the reacting treatment water is of at least 8.5, preferably at least 10. Such a pH allows to perform efficient first and second degradation steps.

Advantageously, the step of reducing the remaining oxidant species is performed by adding a reducing agent, preferably sulphide or bisulfide, in the reacting treatment water. This avoids releasing oxidant species in the environment for a limited cost.

Advantageously, the second degradation step is performed during a predetermined time of at least 1 hour, preferably 2 hours and again preferably 3 hours. Such predetermined time allows to significantly reduce the concentration of veterinary product in the treatment water, for example of more than 95% and preferably more than 99%.

Advantageously, the present method further comprises a pre-oxidation step of removing solid from the moved treatment water before performing the advanced oxidation process. This allows to increase the efficiency of the first degradation step and/or the second degradation step while avoiding degradation of the pumping means and/or clogging of the degradation circuit.

Advantageously, the present method further comprises a post-oxidation step of actively removing any excess of the basic substance and/or any degradation product from the clean treatment water. This post-oxidation step may comprise adding an acidic substance to the clean treatment water, such as hydrochloric acid and/or may comprise filtration on activated carbon.

Advantageously, the veterinary product for aquatic animals is hexaflumuron, which is a widely used veterinary product in fish farming.

A second aspect of the present invention is a treatment method for aquatic animals, comprising the steps of:
  transferring aquatic animals from a growth aquatic area to a treatment aquatic area,
  introducing at least one veterinary product into the treatment aquatic area,
  cleaning the treatment water of the treatment aquatic area by the method of the first aspect of the present invention,
  transferring the aquatic animals from the treatment area to the growth aquatic area.

Advantageously, the step of transferring aquatic animals toward the growth aquatic area is performed by pumping and the clean treatment water is pumped at least partially toward the treatment aquatic area during the step of transferring aquatic animals toward the growth aquatic area.

Advantageously, the treatment aquatic area is comprised in a well-boat and the step of cleaning the treatment water comprises a step of pumping the treatment water from the well boat to an onshore degradation circuit.

A third aspect of the present invention is a degradation circuit adapted to degrade a veterinary product for aquatic animals, the veterinary product being contained in a treatment water containing brackish or sea water, the degradation circuit comprising:
- a reaction vessel configured to degrade at least partially the veterinary product by an advanced oxidation process comprising ozone and a basic substance,
- circuit pumping means adapted to pump the treatment water toward the reaction vessel,
- an ozone generator and means for injecting ozone into the reaction vessel and/or in the circuit pumping means,
- a basic substance vessel and means for injecting the basic substance into the reaction vessel and/or in the circuit pumping means,
- at least one retention vessel adapted to retain the treatment water, ozone and the basic substance and placed downstream the reaction vessel.

Such a degradation circuit has a limited cost of operation and allows to release only a clean treatment water to the environment.

Advantageously, the degradation circuit comprises a solid-liquid separator placed upstream the reaction vessel.

Advantageously, the degradation circuit comprises an ozone degradation system placed in or downstream the retention vessel. The ozone degradation circuit may be a tank provided with pumping means to inject a sulphide component.

Advantageously, the degradation circuit further comprises a buffer tank placed downstream the retention vessel and an acid substance vessel provided with means for injecting the acid substance into the buffer tank.

A fourth aspect of the present invention is a treatment device for treating aquatic animals comprising:
- a treatment tank configured to treat aquatic animals with a treatment water containing sea or brackish water and further comprising a veterinary product,
- transferring means adapted to transfer aquatic animals from a growth aquatic area to the treatment tank and from the treatment tank to the growth aquatic area,
- a degradation circuit according to any of claims 11 to 14 and connected to the treatment tank.

A fifth aspect of the present invention is a method to clean a treatment water containing a veterinary product for aquatic animals, the method comprising the steps of:
- moving the treatment water, from a treatment aquatic area in which the aquatic animals are treated, toward a reaction vessel,
- degrading at least part of the veterinary product from the moved treatment water in the reaction vessel by an advanced oxidation process, to obtain a clean treatment water.

Thanks to the advanced oxidation process performed in the reaction vessel, the veterinary product can be at least partially degraded after the treatment of the aquatic animals and the amount of veterinary product released into the environment can be minimized.

Advantageously, the advanced oxidation process comprises introducing ozone into the reaction vessel, which is a low cost oxidizing agent and efficient precursor of hydroxyl radicals to perform the advanced oxidation process.

Advantageously, the advanced oxidation process further comprises introducing a peroxide and/or a basic substance into the reaction vessel and/or into the moved treatment water. Preferably, the peroxide is hydrogen peroxide and the basic substance is sodium hydroxide.

The advanced oxidation process can be performed preferably by a combination of ozone and hydrogen peroxide and/or a combination of ozone and sodium hydroxide which constitute efficient advanced oxidation processes. Alternatively, other water-soluble peroxides and other basic substances such as basic salts may be considered within the scope of the present invention.

Advantageously, the advanced oxidation process further comprises irradiating the moved treatment water with UV light, preferably by UV-C, which can also contribute efficiently to the advanced oxidation process.

Advantageously, the reaction vessel comprises a catalyst, for example tin oxide, to perform at least part of the advanced oxidation process.

Advantageously, the method comprises a pre-oxidation step of removing solid, such as solid particles, from the moved treatment water before performing the advanced oxidation process. This pre-oxidation step is valuable to increase the efficiency of the advanced oxidation process.

Advantageously, the method comprises a post-oxidation step of actively removing any excess of oxidizing agent or hydroxyl radicals precursor such as ozone, peroxide and/or basic substance, and/or any degradation product from the clean treatment water after or downstream the advanced oxidation process, in order to lower or cancel any damage to the environment caused by the release of the clean treatment water.

Alternatively or in combination, the post-oxidation step can comprise a pH modification, for example by the addition of an acidic substance such as acetic acid or hydrochloride acid. The pH of the clean treatment water after this post-oxidation step is preferably close or similar to the pH of the aquatic environment into which the clean treatment water is released, for example from 8 to 9.

A sixth aspect of the present invention is a treatment method for aquatic animals, comprising the steps of:
- transferring aquatic animals from a growth aquatic area to a treatment aquatic area,
- introducing at least one veterinary product into the treatment aquatic area,
- cleaning the treatment water of the treatment aquatic area by the method of the fifth aspect of the invention,
- transferring the aquatic animals from the treatment area to the growth aquatic area.

Such a treatment method allows to treat aquatic animals, for example against parasites, while limiting or avoiding any release of a veterinary product into the growth aquatic area and into the environment when released.

Preferably, the step of transferring aquatic animals toward the growth aquatic area is performed by pumping and the clean treatment water is pumped at least partially toward the treatment aquatic area during or before the step of transferring aquatic animals toward the growth aquatic area. Preferably, the step of transferring animals toward the growth aquatic area is performed mainly or completely with the clean treatment water.

A seventh aspect of the present invention is a degradation circuit adapted to degrade a veterinary product for aquatic animals, the veterinary product being contained in a treatment water and the degradation circuit comprising:
- a reaction vessel adapted to degrade at least partially the veterinary product by an advanced oxidation process,
- circuit pumping means adapted to pump the treatment water toward the reaction vessel.

Advantageously, the degradation circuit comprises an ozone generator and means for injecting ozone into the reaction vessel such as a bubble generator, for example connected to the ozone generator and adapted to generate bubbles of ozone into the reaction vessel and/or into the pumped treatment water.

Advantageously, the reaction vessel comprises a UV light irradiation system, for example generating or conducting UV-C on or inside the treatment water and/or the reaction vessel.

Advantageously, the reaction vessel comprises a peroxide tank and/or a basic substance tank and at least one injector adapted to inject peroxide and/or the basic substance into the pumped treatment water or into the reaction vessel. For example, an injector may be provided upstream or before the reaction vessel and another injector may be provided into the reaction vessel. Different or several injectors may be used to inject peroxide and/or the basic substance in different injection point of the degradation circuit.

Advantageously, the degradation circuit comprises a solid-liquid separator placed upstream the reaction vessel, such as a filter and/or a decanter. The solid-liquid separator may be adapted to perform the pre-oxidation step.

Advantageously, the degradation circuit comprises an ozone degradation system placed downstream the reaction vessel. For example, the ozone degradation system is adapted to perform the post-oxidation step and may comprise an activated carbon filter.

An eight aspect of the present invention is a treatment device for aquatic animals comprising:
- a treatment tank adapted to treat aquatic animals with a treatment water comprising a veterinary product,
- transferring means adapted to transfer aquatic animals from a growth aquatic area to the treatment tank and from the treatment tank to the growth aquatic area,
- a degradation circuit according to the seventh aspect of the present invention and connected to the treatment tank.

Advantageously, the transferring means comprise a pump having an inlet connected to the treatment tank (treatment aquatic area) and the degradation circuit has an outlet for releasing the clean treatment water.

Advantageously, the outlet of the degradation circuit is arranged in view of the transferring means or in view of the inlet of the pump of the transferring means so that at least part of the clean treatment water is transferred with the aquatic animals when the transferring means or the pump are used to transfer aquatic animals from the treatment tank to the growth aquatic area.

All eight embodiments of the present invention may be combined, including the advantageous steps or features.

BRIEF DESCRIPTION OF THE DRAWINGS

Further advantages and preferred embodiments of the present invention will become apparent from the following detailed description and drawing, in which.

DETAILED DESCRIPTION

The present invention generally relates to a method and a degradation circuit adapted to clean a treatment water containing a veterinary product for aquatic animals. Preferably, the treatment water originates from the sea or from an estuary, i.e. comprises or is based on sea water or brackish water.

The present invention further relates to a treatment method and a treatment system to treat aquatic animals such as fishes, molluscs and crustaceous in the field of aquaculture, preferably of open water aquaculture involving nets or cages placed in a river, a lake or a sea as a growth aquatic area.

In a first step of the treatment method, the aquatic animals are transferred from the growth aquatic area to a treatment aquatic area. This transfer step is performed by transferring means comprising a nest lifted by a crane, baskets, workers' hands and/or preferably a pumping system. The treatment aquatic area can be a treatment tank full of water, for example on a well boat or a closed aquatic area without significant water communication with the environment.

In a second step, at least one veterinary product is introduced in the treatment aquatic area in order to bring the aquatic animals into contact with the veterinary product. This second step may be performed before during or after the first step, depending of the treatment practice and conditions. The veterinary treatment performed by the product is optimized thanks to the treatment aquatic area since the veterinary product is not diluted by open water. In addition, only little quantities of the veterinary product are communicated to the environment and this prevents or limits the environmental impact of aquaculture. Several veterinary products may be used at the same time according to the usual veterinary practices.

The veterinary product also referred as active pharmaceutical ingredients (API) may be any kind of veterinary product or veterinary composition, for example having anti-virus, anti-septic, antibiotic and/or anti-parasitic properties. Preferably, the veterinary product is an anti-parasitic or parasiticide such as preferably a parasiticide for use in the treatment of fish. The term "parasiticide" refers to any substance or composition that is capable of depleting an aquatic animal parasite population, for example by killing or preventing growth or reproduction of the parasites, or otherwise causing the loss or removal of parasites from the host aquatic animal. The aquatic animal is preferably fish, for example salmon.

The terms "treating the parasitic infestation of aquatic animal," "treatment of parasitic infestations of aquatic animal," "treatment of aquatic animal," "treating aquatic animal against parasites," "controlling parasites," "treating parasites," and similar terms, are intended to refer to prophylactic or responsive treatment, such as the control, elimination, protection against, and/or prevention of infestations in fish with parasites. The treatment of parasite infestations encompasses reducing the mean number of parasites infecting most or each aquatic animal in an aquatic animal population. The control of parasite infestations encompasses preventing an increase in the mean number of parasites infecting most or each aquatic animal in an aquatic animal population.

The parasiticide may be selected from the group consisting of Acetylcholinesterase (AChE) inhibitors, GABA-gated chloride channel antagonists, GABA-gated chloride channel inhibitors, Sodium channel modulators, Nicotinic acetylcholine receptor (nAChR) agonists, Nicotinic acetylcholine receptor (aAChR) allosteric activators, chloride channel activators, juvenile hormone mimics, modulators of Chordontonal Organs, inhibitors of mitochondrial ATP synthase, uncouplers of oxidative phosphorylation via disruption of the proton gradient, Nicotinic acethylcholine receptor (nAChR) channel blockers, inhibitors of chitin biosynthesis, type O and type I, moulting disruptors, ecdysone receptor agonists, octopamine receptor agonists, mitochondrial complex III electron transport inhibitors, Mitochondrial complex I electron transport inhibitors, Voltage-dependent sodium channel blockers, inhibitors of acetylCoA carboxylase, Mitochondrial complex II electron transport inhibitors, Ryanodine receptor modulators, tubulin binders, acetylcholinesterase (AChE) mimetics, uncouplers of the oxidative phosphorylation and their combinations.

The veterinary product may be any parasiticide or composition that is suitable for use in controlling parasitic infestations in fish or in other aquatic animals, in other words, that is not toxic to fish, and that is capable of treating fish against parasites, such as infestations with the parasites listed below. For example, the parasiticide may be: a sodium channel modulator, which may be a pyrethroid, such as deltamethrin, or an oxadiazine, such as indoxacarb; a chloride channel modulator, which may be an avermectin, such as emamectin, or ivermectin, or may be a macrolide such as moxidectin, or a milbemycin such as milbemycin oxime; a neurotoxin, which may be a neonicotinoid, such as nitenpyram, or a triazine, such as cyromazin; a pyridine, such as pymetrozine; or a benzoyl urea, which may be a chitin synthesis inhibitor.

The parasiticide may be suitable for use in the treatment of fish against parasites. This includes, in particular, parasites of the order Siphonostomatoida (lus), Dactylogyridea (*Diplectanum*), Mazocraeidea (such as Sparycotyle, and *Heterobothrium*), Hymenostomatida (freshwater white spot), Capsalidae (*Benedenia*), Dactylopodida (*P. perurans*), Cyclopoida, Parabodonida (*Cryptobia* spp.), Scuticocilitida (ciliates), Gluegeida (*L. salmonae*), Bivalvulida (such as *Myxobolus, Ceratomyxa* and *H. ictaluri*), Monopisthocotylea (*gyrodactylus*), Strigeatida (blood flukes), Botriocephalidea (tapeworms), Spirurida (nematodes), Arguloida (carp lice infreshwater) and Ascaridida (Anisakis) and genus *Cryptocaryon* (white spot in seawater), Diplostomum (eye fluke in freshwater), and Enteromyxum (*E. leei*). In particular, the following families of parasite may be targeted by the parasiticide: Caligidae, Cecropidae, Dichelesthiidae, Lernaeopodidae, Pandaridae, Pennellidae, Sphyriidae, Lernaeidae, Bomolochidae, Chondracanthidae, Ergasilidae, Philichthyidae, and Argulidae. Of particular interest are parasites of the genera *Dissonus, Caligus* (including in particular, *C. curtus, C. elongatus, C. clemensi, C. rogercresseyii*), and *Lepeophtheirus* (including *L. salmonis*). Infestation with sea lice in particular (such as *Lepeophtheirus salmonis, Caligus elongatus*, and *Caligus rogercresseyi*) is considered to be one of the most important disease problems in the farming of salmonids, especially in Atlantic salmon (*Salmo solar*) and rainbow trout (*Oncorhynchus mykiss*). The parasiticide may be suitable for bath treatment and/or in-feed treatment of fish and may target a broad range of parasites, or may be specific for a small group of parasites, such as an individual type of parasite.

In particular, the veterinary product may comprise, for example: a benzoyl urea; an avermectin such as emamectin; an organophosphate such as azamethiphos; or a pyrethroid such as deltamethrin. When the veterinary product is a benzoyl urea, it is preferably a chitin synthesis inhibitor, such as bistrifluron, chlorfluazuron, flucycloxuron, flufenoxuron, hexaflumuron, novaluron, noviflumuron, buprofezin, diflubenzuron, fluazuron, lufenuron, teflubenzuron and their combinations. The inhibitors may be present in the antiparasitic formulation in the free form, or in any active form, such as in the form of any veterinary acceptable salt. Preferably, the chitin synthesis inhibitor may be hexaflumuron, lufenuron, or diflubenzuron. Most preferably, the veterinary product comprises hexaflumuron.

The treatment step in which the aquatic animals are in contact with the veterinary product may be monitored by time and/or by the concentration decrease of the veterinary product into the treatment water. In addition, the concentration of veterinary product could be tuned according to veterinary guidelines. The veterinary product could be added in any form into the treatment aquatic area, such as liquid, solid or gaseous, pure or in a diluted form or within animals' food.

In a third step, the treatment water of the treatment aquatic area is moved, for example pumped or poured, toward a reaction vessel adapted to degrade the veterinary product by an advanced oxidation process. This third step is performed preferably at the end of the second step i.e. when the treatment time of the aquatic animals has lapsed. However, in a case of a treatment aquatic area of a large volume, it is possible to start the third step before the end of the second step since a certain time may be required to move an important volume of water of the treatment aquatic area. The pumping means or any other means to move the treatment water may be part of a degradation circuit with the reaction vessel.

The treatment water can be moved by circuit pumping means toward the reaction vessel adapted to degrade the at least one veterinary product by an advanced oxidation process, in a fourth step. The third and the fourth steps specifically relate to a method to clean the treatment water according to an aspect of the present invention. The advanced oxidation process consists in an oxidation of the veterinary product by two different oxidizing agents or precursors of hydroxyl radicals, which are at least part of primary oxidant species. Preferably, one of the precursors is ozone which may be introduced into the treatment water and/or into the reaction vessel thanks to one or several bubble generators or bubblers connected to an ozone generator.

Another precursor of hydroxyl radicals may be chosen between a peroxide or a peroxide precursor and/or UV irradiation, for example using UV-C. In addition, a catalyst may also be used to generate or contribute to generate oxidant radicals such as titanium oxide. For example, the peroxide can be hydrogen peroxide or an inorganic peroxide such as sodium peroxide. In addition, ferrous iron can be used simultaneously with the peroxide, for example under the form of Fenton's reagent.

Alternatively or in combination, another precursor of hydroxyl radicals as primary oxidizing species may be at least one basic substance such as an alkali or caustic soda (sodium hydroxide) that may be added under solid or liquid form to the treatment water before or during the advanced oxidation process, for example to obtain a pH of the treatment water of at least 10 and preferably from 10 to 12 or 10 to 11. Other basic substances such as calcium hydroxide, potassium hydroxide or other water-soluble basic substances may also be used according to environmental regulations. Preferably, the advanced oxidation process is performed thanks to ozone and sodium hydroxide, for example as the only source of primary oxidant species or as the only reagents.

The parameters of the advanced oxidation process can be chosen in order to eliminate the veterinary product from the moved treatment water or at least to decrease the concentration or amount of veterinary product below the environmental standards. In particular, ozone flow rate may be regulated according to the concentration of ozone in the clean treatment water after the advanced oxidation process and/or according to the concentration of veterinary product in the treatment water. For example, the veterinary product concentration can be reduced by 50%, preferably 80%, again preferably 90% and most preferably 95% or 99%. Preferably, the concentration of the veterinary product in the treatment water after the advanced oxidation process is below a no-effect concentration, for example below $5.8 \times 10^{-8}$ mg/l for hexaflumuron.

A first degradation step may be performed through the above advanced oxidation process, in order to obtain a reacting treatment water, i.e. treatment water containing active oxidation species. In addition, a second degradation step may be performed by retaining the reacting treatment water during a predetermined time, for example without the addition of any oxidant or oxidant precursors with regard to the first degradation step. The second degradation step is performed in order to degrade the remaining portion of the veterinary product which was not degraded in the first degradation step.

Preferably, the second degradation step is maintained during a predetermined time of at least 1 hour, preferably 2 hours and again preferably 3 hours. The predetermined time may be chosen according to the concentration of oxidants or oxidant precursors introduced in the first degradation step and/or the type of veterinary product to be clean.

Without being bound by any theory, it is believed that secondary oxidant species are formed during the first degradation step, for example by reaction of ozone and/or the primary oxidant species with treatment water components. The second degradation step may allow the reaction of these secondary oxidants species formed during the first degradation step with the veterinary product remaining in the reacting treatment water. The quantity of oxidants and/or oxidant precursors used in the Advanced Oxidation Process of the first degradation step may thus be limited, thus decreasing cost and increasing environmental efficiency. The second degradation step may be performed without any catalyst or UV, which also allows to limit costs and environmental impact.

In the case where the treatment water is based on sea or brackish water, a significant amount of bromide ($Br^-$) is contained in the treatment water, for example around 0.065 mg/l as an average for sea water. It is believed that such bromide may form secondary oxidant species (also called TRO or Total Residual Oxidants) such as bromine compounds, mainly present as hyprobromous acid or hypobromite ($BrO^-$). These secondary oxidant species have a lower reaction rate than ozone or the primary oxidant species, but their presence may be leveraged in order to perform part of the degradation of the veterinary product, in the second degradation step.

The degradation circuit can further comprise a solid-liquid separator performing a pre-oxidation step of removing solid from the moved treatment water, i.e. before performing the advanced oxidation process. This pre-oxidation step can be performed by any method known in the art, for example by filtration, decantation and/or flocculation. Removing solid from the moved treatment water allows to increase the efficiency of the advanced oxidation process and thus to limit the use of ozone, basic substance, peroxide and/or UV light.

In addition, the degradation circuit can comprise an ozone degradation system adapted to perform a post-oxidation or post-degradation step, in order to actively remove excess of oxidizing agent such as ozone and peroxide, basic substance and/or to remove degradation product from the veterinary product. For example, this post-oxidation step is performed using an activated carbon filter. Alternatively or in combination, a plurality of elements or a filter provided with biological material such as a biofilm may be used. Preferably, a reducing agent is added after the end of the oxidation process such as after the second degradation step. This reducing agent may be chosen among sulfite, bisulfite, metabisulfite or thiosulfate components and allow to degrade the remaining oxidant species (possibly ozone and the primary oxidant species and in particular the secondary oxidants species).

The treatment water after the advanced oxidation process (first degradation step) or preferably after the second degradation step becomes the clean treatment water and can be either injected into the treatment aquatic area and/or can be released into the environment or to a larger water treatment system. In case a basic substance has been introduced during or before the advanced oxidation process, it may be preferable to reduce the pH of the clean treatment water for example below 9 or below 8.5 such as from 6.5 to 9.0 or 6.5 to 8.5, for example by neutralization of the basic substance with an acidic substance such as hydrochloride acid.

In a fifth optional step, the aquatic animals may be released into the growth aquatic area, for example using a manual transfer or a mechanical transfer such as using nets and cranes or pumping means. This fifth step may be started after the end of the fourth step, i.e. after degrading the veterinary product by the advanced oxidation process or during the advanced oxidation process.

If pumping means are used for this fifth step to pump the aquatic animals out of the treatment aquatic area toward the growth aquatic are, then it may be valuable to reinject the clean treatment water into the treatment aquatic area in order to decrease the quantity of veterinary product pumped out with the aquatic animals. Preferably, the clean treatment water can be injected into or close to the input of the pumping means used for this transfer step. This preferable arrangement allows to more efficiently reduce the quantity of the veterinary product released to the growth aquatic area if the fifth step is performed while the fourth step is not yet totally completed.

Cleaning Treatment Water: First Detailed Embodiment

Figure 1:
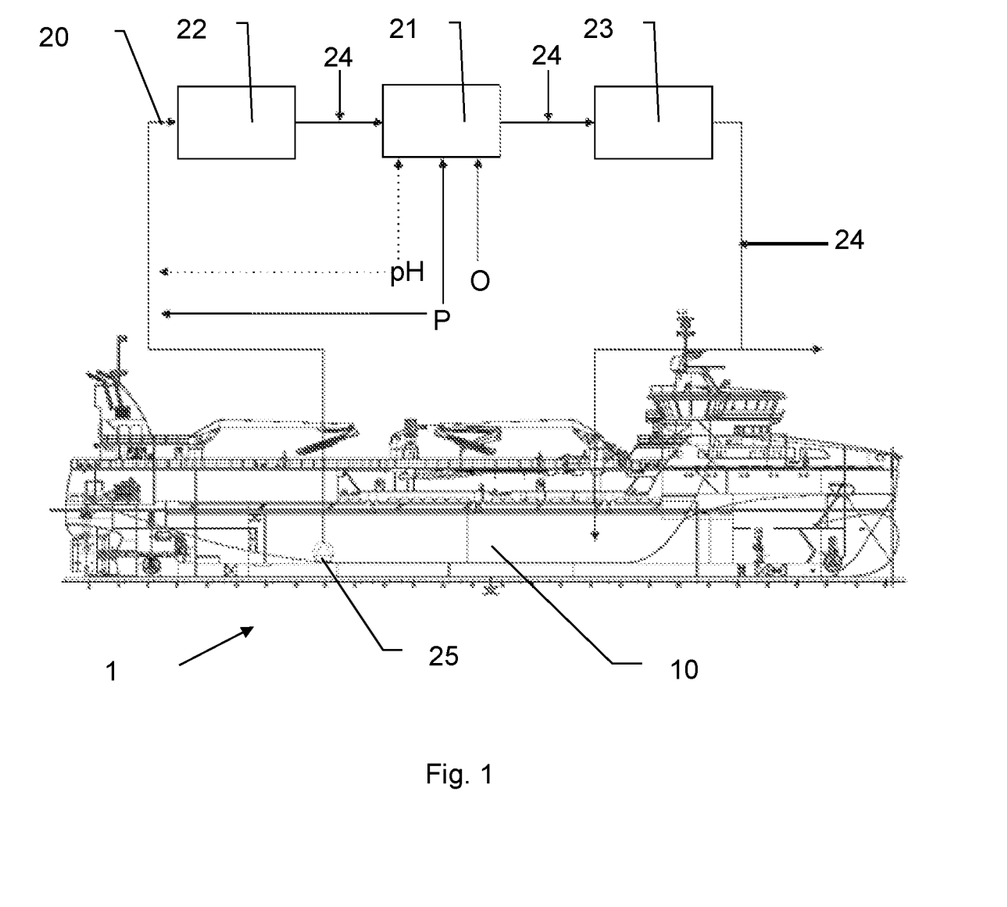
FIG. 1 shows a treatment device for aquatic animals according to an embodiment of the present invention.

Now with reference to FIG. 1, which describes an embodiment of the invention, a treatment device 1 represented by a well-boat comprises a treatment aquatic area 10 as a well or a pool inside the well-boat which is filled with the treatment water. A degradation circuit 20 comprises a pump or circuit pumping means 25 in order to pump the treatment water and a reaction vessel 21 to perform an advanced oxidation process of the veterinary product in the treatment water, in order to output the clean treatment water.

The reaction vessel 21 can comprise one or more reactors, columns or tanks adapted, for example for the bubbling of ozone $O_3$ (O inlet in FIG. 1) and injection of a basic substance (pH inlets in FIG. 1) and/or peroxide (P inlets in FIG. 1). For example, the degradation circuit can comprise a bubble generator connected to an ozone generator and/or a peroxide tank and an injector adapted to inject peroxide into the pumped treatment water (not represented). In addition, pH regulation means may be provided in order to regulate the pH of the pumped treatment water inside the reaction vessel 21 or upstream in the degradation circuit 20 (pH inlets in FIG. 1).

Alternatively or in combination, the reaction vessel 21 may be provided with a catalyst, such a titanium oxide as bulk or fixed on a support such as glass sheets. In addition, the reaction vessel may comprise a UV light source, for example generating UV-C light. In addition, a second degradation step may be performed as described above.

Pre-oxidation means in the form of a solid-liquid separator 22 such as a filter and/or a decanter may be placed upstream the reaction vessel 21 in the degradation circuit 20 in order to remove most or all solid from the moved treatment water by filtration, decantation and/or flocculation.

In addition, post-oxidation means such as an ozone degradation system 23 may be placed downstream the reaction vessel 21 in order to actively degrade most or all ozone remaining in the clean treatment water and/or to remove most or all degradation product from the veterinary product. For example, this ozone degradation system 23 or post-oxidation means comprises an activated carbon filter. Alternatively or in combination, a filter or a plurality of mobile elements provided with biological material such as a biofilm may be used.

The post-oxidation means can further comprise a pH neutralization circuit (not represented) provided downstream the reaction vessel 21 in order to neutralize any basic substance introduced in the treatment water before or during the advanced oxidation process. For example, this pH neutralization circuit may comprise a tank and means for injecting an acidic solution, such as aqueous hydrochloride acid, sulfuric acid or acetic acid. The clean treatment water pH may thus be regulated and controlled thanks to a pH sensor in order to reach a pH of at most 9.0 or 9.5, for example 6.5 to 9.0.

The degradation circuit 20 further comprises a plurality of valves and sensors 24 and may release the clean treatment water either into the treatment aquatic area 10 and or in the growth treatment area such as a river, a lake or a sea. The sensors 24 may be redox sensors, pH sensors and/or temperature sensors.

Cleaning Treatment Water: Second Detailed Embodiment

Figure 2:
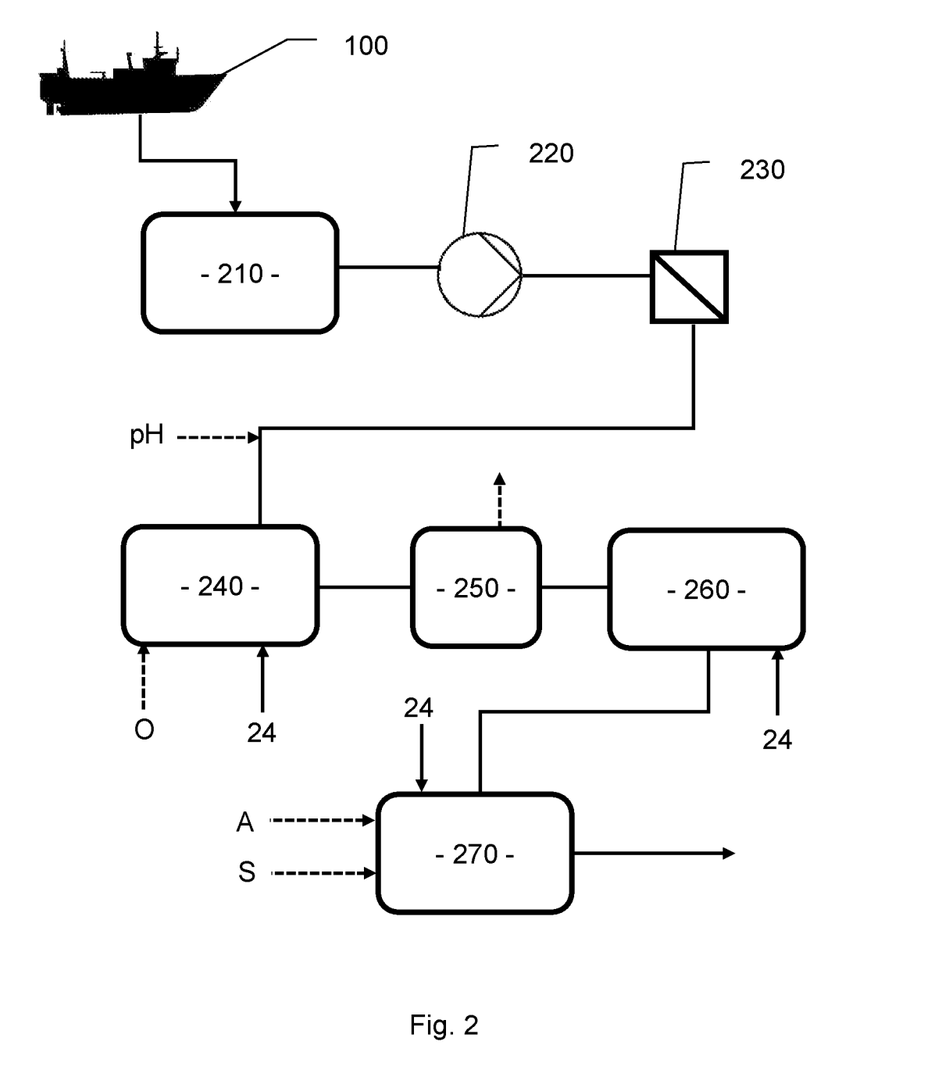
FIG. 2 shows a degradation circuit to clean a treatment water containing a veterinary product for aquatic animals according to an embodiment of the present invention.

With reference to FIG. 2, a second embodiment of a degradation circuit according to the present invention is described. To the contrary of the first embodiment, the degradation circuit 200 may be based on-shore, for example close on in a harbour, which allows a simpler construction and maintenance of the degradation circuit 200 as well as its connection to several treatment aquatic areas, such as several well-boats.

In a first step, the treatment of aquatic animals with a veterinary product may be performed as disclosed above. In a second step, the treatment water may be moved from the treatment aquatic area 100, such as the well of a well-boat positioned on a pier, to an optional buffer tank 210.

In a third step, the treatment water may be moved by a pump 220 toward optional pre-oxidation means, such as a solid-liquid separator 230, for example a filter. This filter may be of any type known by the skilled person and may be configured in order to remove any solid particle from the moved treatment water, for example bigger than 500 µm, preferably bigger than 250 µm and again preferably bigger than 150 µm or less.

In a fourth step, the filtered treatment water may be moved to a reaction vessel 240 and reagents allowing an advanced oxidation process may be added to the filtered treatment water in the reaction vessel 240 and/or before the reaction vessel 240 to obtain the reacting treatment water. These reagents preferably comprise or consist in a basic substance, such as sodium hydroxide (pH inlet in FIG. 2) and ozone (O inlet in FIG. 2) coming for example from an ozone generator (not shown). The reacting treatment water has preferably a basic or alkaline pH, as previously detailed, such as at least 8.5 or preferably at least 10 and a first degradation step of a portion of the veterinary product may occur thanks to the advanced oxidation process, as described above.

In a fifth, optional step, the reacting treatment water may be degassed, in order to remove the excess gas coming from the ozone generator and not dissolved in the reacting treatment water, in a degassing vessel 250. In an alternative embodiment not shown, degassing may be performed in the reaction vessel 240 or in a part of the reaction vessel 240.

The reacting treatment water may then be moved to a retaining vessel 260 in a sixth step. Preferably, the retaining vessel 260 does not perform any operation than a second degradation step of the remaining veterinary product i.e. the veterinary product which has not been degraded in the first oxidation step.

This second degradation step is performed in particular thanks to the secondary oxidant species, as discussed above, and possibly on the basis of the dissolved ozone and the primary oxidant species remaining in the reacting treatment water, according to the reaction conditions of the first degradation step. For example, stirring may occur but no other reagent may be added to the reacting treatment water. In the case of a continuous flow process, the retaining vessel is designed such as the reacting treatment water is retained during a predetermined time, such as at least 30 minutes, preferably at least 1 hour, again preferably 2 hours and most preferably 3 hours.

In a seven step, the reacting treatment water may be moved to post-oxidation or post-degradation means comprising for example a post-oxidation vessel 270 to neutralize or reduce the remaining primary and/or secondary oxidant species (thanks to a sulphide substance inlet S) and/or the basic substance (thanks to an acid substance inlet A), as discussed above, to obtain the clean treatment water. Such a clean treatment water may then be released in the environment, such as the sea, provided it complies with local regulations.

The degradation circuit 200 may also be provided with safety monitoring and regulation means such as sensors 24, valves, safety valves, as discussed with regard to the first embodiment of FIG. 1. For example, for a degradation circuit adapted to treat 250 m$^3$/h of treatment water, at least 30 kg/h of ozone may be required.

In a batch alternative to the degradation circuit 200, the reaction vessel 240, the degassing vessel 250 and the retention vessel 260 may be combined in a single reaction vessel in which the first degradation step may be performed by injection of ozone, and the second degradation step may be performed by stopping the injection of ozone and maintaining the reacting treatment water during the predetermined time in the single reaction vessel.

Such an alternative allows to reduce costs of the degradation circuit but limits the volume of treatment water than can be clean.

Experimental Data

The inventors made several experiments to determine the best conditions of the first degradation step and/or the second degradation step.

In a first experiment, a first degradation step has been carried out by using hexaflumuron as the veterinary product and ozone and sodium hydroxide were used to perform the Advanced Oxidation Process at pH=10. The treatment water was sea water with an initial concentration of hexaflumuron of 1.375 mg/l.

Figure 3:
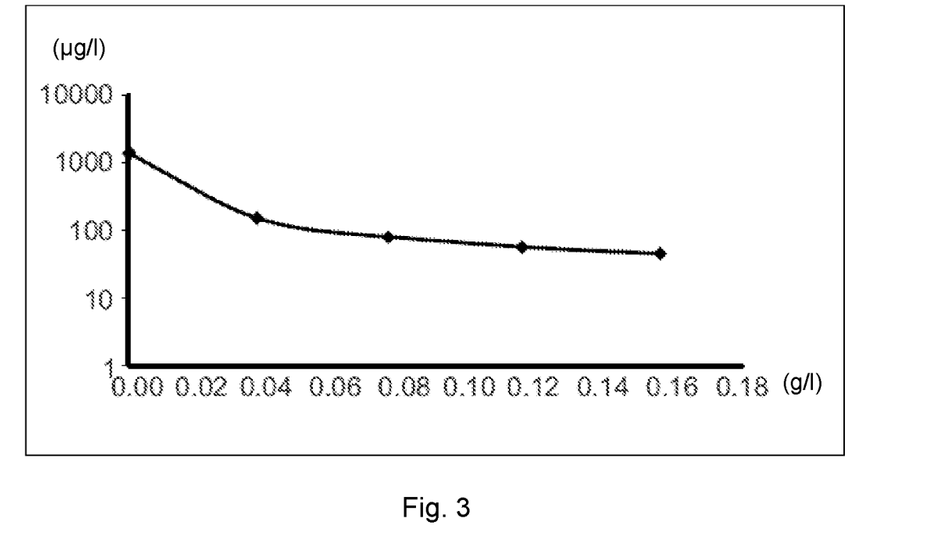
FIG. 3 shows a graph of the concentration of hexaflumuron as a veterinary product, as a function of the concentration of ozone, in a reacting treatment water of pH=10 after a first degradation step.

With reference to FIG. 3, the y-axis is the concentration of hexaflumuron in µg/l, using a logarithmic scale. On an x-axis is the concentration of ozone dissolved in the reacting treatment water in g/l. After the first degradation step of hexaflumuron during a reaction time of 20 minutes with different concentrations of ozone dissolved in the reacting treatment water, the reacting treatment water was sampled and ozone was reduced with a sulphite component. The remaining concentration of hexaflumuron in the samples of reacting treatment water was then measured by LC-MS/MS.

According to this experiment, an ozone concentration of at least 0.040 g/l allows a significant reduction of the hexaflumuron concentration to approximately 150 µg/l, while an ozone concentration above 0.120 g/l only allows a limited additional reduction of the hexaflumuron concentration to 56 µg/l. Consequently, ozone may be injected in the reacting treatment water in order to obtain a dissolved concentration of 0.040 g/l to 0.120 g/l, preferably 0.050 g/l to 0.100 g/l, again preferably 0.060 g/l to 0.090 g/l and most preferably 0.070 g/l to 0.080 g/l such as 0.076 g/l.

In a second experiment, the reacting treatment water with an ozone concentration of 0.076 g/l and a pH=10 obtained by sodium hydroxide was introduced in a retaining tank and retained under stirring, to perform a second degradation step. This reacting treatment water had a remaining concentration of hexaflumuron of 80 µg/l after the first degradation step. The reacting treatment was sampled after different retention times and the second degradation step was stopped in these samples by the addition of a sulphite component. The remaining concentration of hexaflumuron in these samples of clean treatment water (after the second degradation step) was then measured as previously described.

Figure 4:
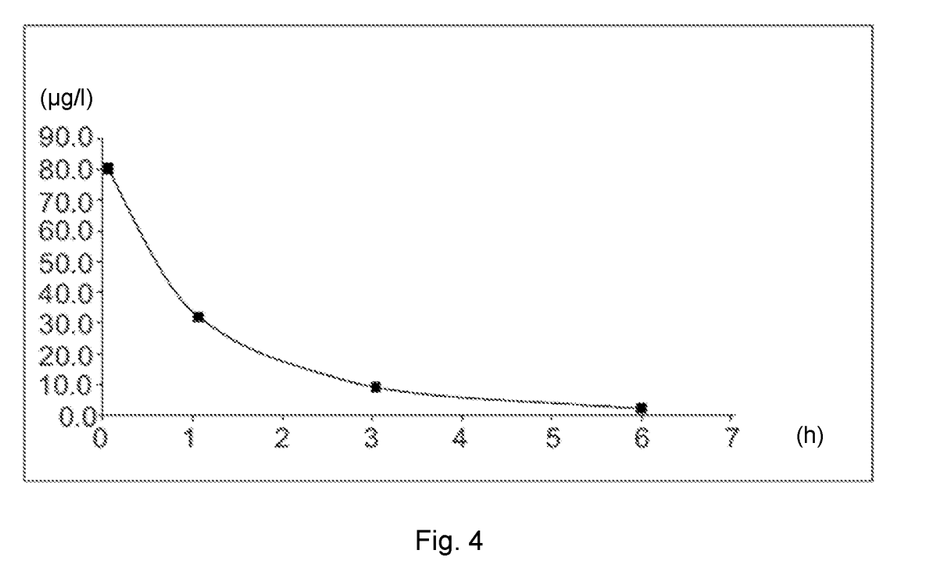
FIG. 4 shows a graph of the concentration of hexaflumuron as a veterinary product, as a function of retention time, in a reacting treatment water of pH=10 after a first degradation step and a second degradation step.

With reference to FIG. 4, the x-axis shows the retention time in hours and the y-axis shows the concentration of the hexaflumuron in the sample in µg/l. After a retention time of 1 hour, a significant decrease of the concentration of hexaflumuron is already obtained, and the concentration of hexaflumuron is even more decreased after a retention time of 3 hours and reaches a concentration as low as 9.2 µg/l, which corresponds to a reduction in concentration greater than 99% with regard to the initial concentration of hexaflumuron in the treatment water. Above 3 hours of retention time, the concentration of hexaflumuron is even more reduced, for example to 2.6 µg/l after a 6-hour retention time, but such important retention times might not be justified with regard to the limited additional reduction obtained. A preferable retention time is thus from 1 hour to 3 hours, preferably from 2 hours to 3 hours and again preferably 2.5 or 3 hours.

Thanks to these experiments, the inventors determined the most preferable parameters of the first degradation step and the second degradation step. In addition, these experiments demonstrate that performing a second degradation step according to the present invention allows to significantly reduce the quantity ozone injected to perform the first degradation step while allowing to reach very low concentration of remaining veterinary product.

Although the present invention has been described and illustrated in detail, it is clearly understood that the same is by way of illustration and example only and is not to be taken by way of limitations, the scope of the present invention being limited only by the terms of the appended claims.

The invention claimed is:

1. A method to clean a treatment water containing brackish or sea water and further containing a veterinary product for aquatic animals, the method comprising:
    moving the treatment water, via a circuit pump from a treatment aquatic area in which the aquatic animals are treated, toward a reaction vessel,
    performing a first degradation of a portion of the veterinary product from the treatment water in the reaction vessel by an advanced oxidation process comprising introducing ozone and a basic substance into the treatment water together, to obtain a reacting treatment water,
    performing a second degradation of a remaining portion of the veterinary product in the reacting treatment water after the first degradation by:
        moving the reacting treatment water, via the circuit pump, from the reaction vessel to a retention vessel, and
        retaining the reacting treatment water in the retention vessel for a predetermined period of time and without introducing ozone based on at least one of a concentration of ozone in the treatment water and a type of the veterinary product, and
    reducing a remaining oxidant species of the reacting treatment water, after the second degradation, in order to obtain a clean treatment water.

2. The method to clean the treatment water according to claim 1, wherein the basic substance is introduced so that a pH of the reacting treatment water is of at least 8.5.

3. The method to clean the treatment water according to claim 1, wherein reducing the remaining oxidant species is performed by adding a reducing agent in the reacting treatment water.

4. The method to clean the treatment water according to claim 3, wherein the reducing agent comprises a sulphide or a bisulfide.

5. The method to clean the treatment water according to claim 1, wherein the predetermined period of time is at least 1 hour.

6. The method to clean the treatment water according to claim 1, further comprising removing solids from the moved treatment water before performing the first degradation.

7. The method to clean the treatment water according to claim 1, further comprising actively removing any excess of the basic substance and/or any degradation product from the clean treatment water.

8. The method to clean the treatment water according to claim 1, wherein the veterinary product for aquatic animals is hexaflumuron.

9. A treatment method for aquatic animals, comprising:
    transferring aquatic animals from a growth aquatic area to a treatment aquatic area,
    introducing at least one veterinary product into the treatment aquatic area,
    cleaning the treatment water of the treatment aquatic area by the method of claim 1, and
    transferring the aquatic animals from the treatment area to the growth aquatic area.

10. The treatment method for aquatic animals according to claim 9, wherein transferring aquatic animals to the growth aquatic area is performed by pumping and wherein the clean treatment water is pumped at least partially toward the treatment aquatic area during transferring aquatic animals toward the growth aquatic area.

11. The treatment method for aquatic animals according to claim 9, wherein the treatment aquatic area is comprised in a well-boat and cleaning the treatment water comprises pumping the treatment water from the well-boat to an onshore degradation circuit.

12. A degradation circuit adapted to degrade a veterinary product for aquatic animals, the veterinary product being contained in a treatment water containing sea or brackish water, the degradation circuit comprising:
   a circuit pump adapted to pump the treatment water;
   a reaction vessel configured to receive the treatment water degrade at least partially the veterinary product by an advanced oxidation process comprising introducing ozone and a basic substance into the treatment water together, wherein the reaction vessel comprises:
      an ozone generator coupled to a bubble generator for and configured to inject the ozone into the reaction vessel, and
      a basic substance vessel coupled to an injector and configured to inject the basic substance into the reaction vessel, and
   at least one retention vessel configured to:
      receive the treatment water from the reaction vessel after the advanced oxidation process is performed on the treatment water; and
      retain the treatment water, at least a portion of the ozone, and the basic substance for a predetermined period of time based on at least one of a concentration of ozone in the treatment water and a type of the veterinary product, wherein the at least one retention vessel is placed downstream the reaction vessel.

13. The degradation circuit according to the claim 12, wherein the degradation circuit comprises a solid-liquid separator placed upstream the reaction vessel.

14. The degradation circuit according to claim 12, wherein the degradation circuit comprises an ozone degradation system placed in or downstream the retention vessel.

15. The degradation circuit according to claim 12, further comprising a buffer tank placed downstream the retention vessel and an acid substance vessel provided with means for injecting the acid substance into the buffer tank.

16. A treatment device for treating aquatic animals comprising:
   a treatment tank configured to treat aquatic animals with a treatment water containing sea or brackish water and further comprising a veterinary product,
   transferring means adapted to transfer aquatic animals from a growth aquatic area to the treatment tank and from the treatment tank to the growth aquatic area, and
   a degradation circuit according to claim 12 and connected to the treatment tank.

17. A method to clean a treatment water containing brackish or sea water and further containing a veterinary product for aquatic animals, the method comprising:
   moving the treatment water, from a treatment aquatic area in which the aquatic animals are treated, toward a reaction vessel,
   performing a first degradation step of a portion of the veterinary product from the treatment water in the reaction vessel by an advanced oxidation process consisting of introducing ozone and a basic substance into the treatment water together, to obtain a reacting treatment water, and
   performing a second degradation step of a remaining portion of the veterinary product in the reacting treatment water after the first degradation step, by retaining the reacting treatment water for a predetermined period of time and without introducing ozone based on at least one of a concentration of ozone in the treatment water and a type of the veterinary product.

* * * * *